United States Patent [19]
Andrews et al.

[11] Patent Number: 5,634,099
[45] Date of Patent: May 27, 1997

[54] DIRECT MEMORY ACCESS UNIT FOR TRANSFERRING DATA BETWEEN PROCESSOR MEMORIES IN MULTIPROCESSING SYSTEMS

[75] Inventors: Lawrence P. Andrews, Boca Raton; Derrick Arias, Coral Springs; Baiju D. Mandalia, Boca Raton; Oscar E. Ortega, Miami Beach; John C. Sinibaldi, Pompano Beach; Kevin B. Williams, North Lauderdale, all of Fla.

[73] Assignee: International Business Machines Corporation, Armonk, N.Y.

[21] Appl. No.: 352,953

[22] Filed: Dec. 9, 1994

[51] Int. Cl.⁶ .................................................. G06F 15/17
[52] U.S. Cl. .................... 395/200.07; 395/844; 395/859; 395/250
[58] Field of Search ........................... 395/200.07, 842, 395/844, 859, 250; 365/189.01

[56] References Cited

U.S. PATENT DOCUMENTS

| | | | |
|---|---|---|---|
| 4,751,634 | 6/1988 | Burrus, Jr. et al. | 395/883 |
| 4,858,112 | 8/1989 | Puerzer et al. | 395/200.2 |
| 4,933,846 | 6/1990 | Humphrey et al. | 395/287 |
| 4,937,736 | 6/1990 | Chang et al. | 395/418 |
| 4,965,718 | 10/1990 | George et al. | 395/478 |
| 4,975,828 | 12/1990 | Wishneusky et al. | 395/831 |
| 5,058,110 | 10/1991 | Beach et al. | 370/85.6 |
| 5,093,780 | 3/1992 | Sunahara | 395/800 |
| 5,146,596 | 9/1992 | Whittaker et al. | 395/296 |
| 5,182,800 | 1/1993 | Farrell et al. | 395/844 |
| 5,247,671 | 9/1993 | Adkins et al. | 395/650 |
| 5,251,303 | 10/1993 | Fogg, Jr. et al. | 395/844 |
| 5,404,522 | 4/1995 | Carmon et al. | 395/650 |
| 5,430,844 | 7/1995 | Shitara et al. | 395/846 |
| 5,444,853 | 8/1995 | Lentz | 395/250 |
| 5,448,702 | 9/1995 | Garcia, Jr. et al. | 395/280 |
| 5,485,594 | 1/1996 | Foster | 395/472 |
| 5,488,724 | 1/1996 | Firoozmand | 395/200.07 |
| 5,513,368 | 4/1996 | Garcia, Jr. et al. | 395/842 |
| 5,539,897 | 7/1996 | Samanta et al. | 395/492 |
| 5,548,791 | 8/1996 | Casper et al. | 395/858 |
| 5,555,380 | 9/1996 | Suzuki | 395/250 |
| 5,557,744 | 9/1996 | Kobayakawa et al. | 395/200.01 |
| 5,561,816 | 10/1996 | Mitsuhira et al. | 395/842 |

OTHER PUBLICATIONS

Takada, Hiroaki and Sakamura, Ken, "Implementation of Inter–processor Synchronizartion/Communication and Design Issues of ITRON–MP", TRON Project, 1991 Symposium, pp. 44–56, (IEEE Publications).

IBM Technical Disclosure Bulletin vol. 35, No. 6, Nov. 1992; Direct Memory Access Queue Mechanism for Sharing a Single Direct Memory Access Channel for Multiple Processor with Common Data Memory.

*Primary Examiner*—Tod R. Swann
*Assistant Examiner*—Keith W. Saunders
*Attorney, Agent, or Firm*—Richard A. Tomlin; Robert Lieber; Michael J. Buchenhorner

[57] ABSTRACT

There is provided a Direct Access Memory Unit (DAu) that is associated with a remote processor module in a multiprocessing system. The DAU performs Direct Memory Access (DMA) operations independently of a Central Processing Unit (CPU) in the remote processor module. The CPU requests a DMA by writing information relevant to the DMA to the remote processor's memory. The address of each control block is written to a circular queue, also in the remote processor's memory. The DAU determines if there are any control blocks to process and if so, the DAU will perform the DMA operation (reading data from or writing data to the memory of the host processor), all without the intervention of the CPU of the remote processor module. The CPU adds a new control block by loading its address in a location in the circular queue that is ahead of the circular queue location that the DAU is processing. The CPU can abort a pending DMA request during DAU operations by setting a skip bit in the control block. Upon the completion of performing a DMA request, the DAU will set a complete bit in the control block in the remote processor's memory. An interrupt can also be sent to the CPU, wherein the CPU is advised that a DMA request has been completed. The data in a DMA operation is sent in bursts to a buffer located between two busses having different data transmission rates.

10 Claims, 13 Drawing Sheets

DAU CONTROL BLOCK

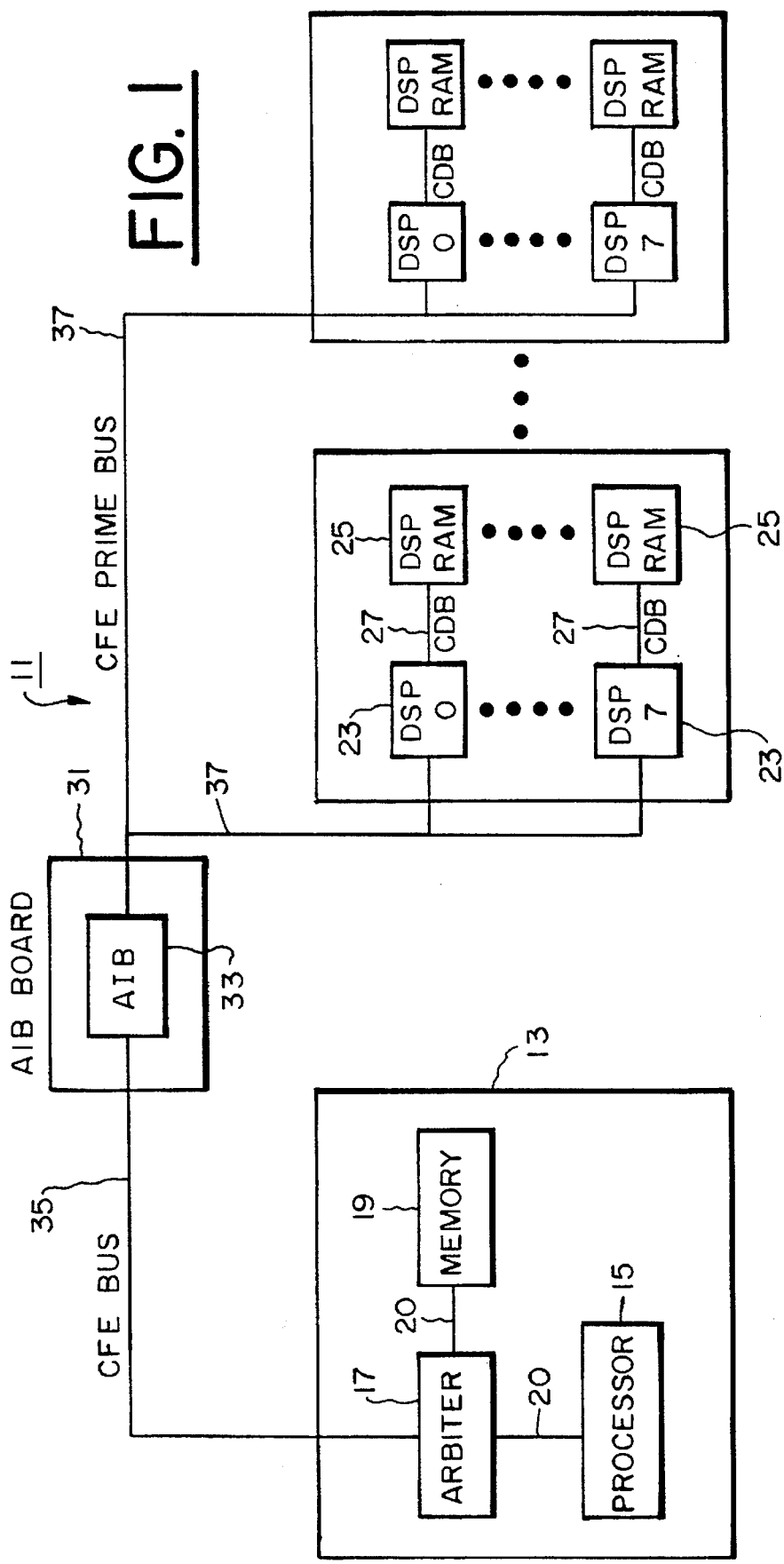

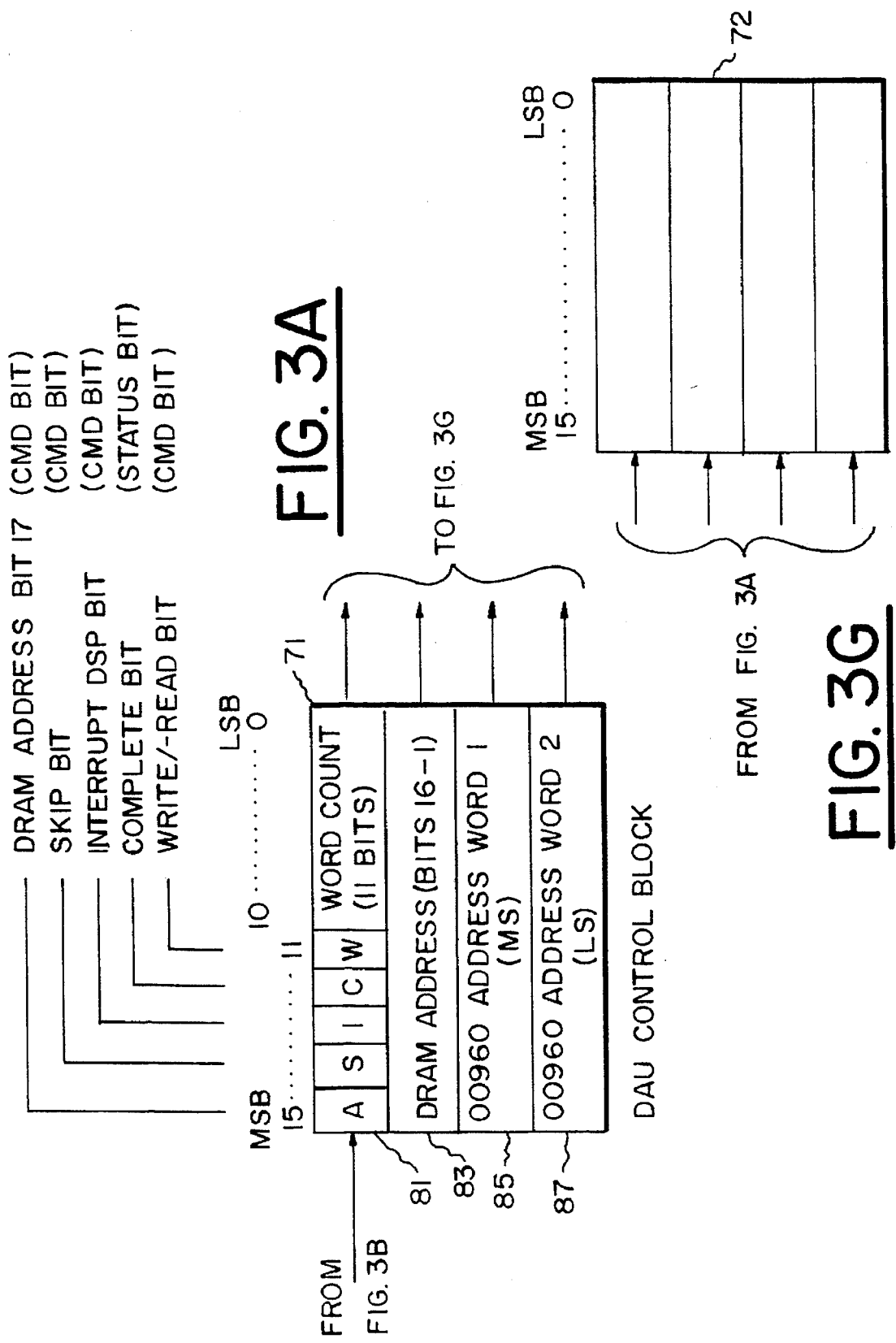

5,634,099

DIRECT MEMORY ACCESS UNIT FOR TRANSFERRING DATA BETWEEN PROCESSOR MEMORIES IN MULTIPROCESSING SYSTEMS

TECHNICAL FIELD OF THE INVENTION

The present invention relates to a data processing system that includes multiple processors that utilize direct memory access to transfer data between individual memories that are associated with the processors.

BACKGROUND OF THE INVENTION

In a multi-processing system, a group of processors execute a variety of tasks. Data is transferred between the processors through one or more Direct Memory Access (DMA) channels.

For example, one type of multi-processing system has a host processor. The host processor has data memory, typically in the form of Random Access Memory (RAM). Such memory is referred to hereafter as "DRAM", which is not to be confused with "Dynamic RAM" although the memory may be implemented with Dynamic RAM modules, but need not necessarily be so implemented. Remote processors are provided, each of which has its own DRAM.

The individual remote processors perform one or more processing tasks. For example, in performing a processing task, a remote processor often accesses data (or code) in the host processor DRAM and transfers a copy of that data to the remote processor's DRAM. The remote processor then executes processing on the data. When finished processing, the data in the remote processor DRAM is made available to the host processor. The data is transferred from the remote processor DRAM to the host processor DRAM. Thus, the host processor can utilize the processed data.

Such transfers of data between the host processor DRAM and a remote processor DRAM occur through a DMA channel. The transfer is called "direct" because the host processor does not participate in the access to its DRAM by the remote processor.

However, in prior art multi-processing systems, this directness of memory access only occurs at the host processor end of the DMA channel. At the remote processor end of the DMA channel, the remote processor participates in the data transfer. Each remote processor has a operating system or kernel. The kernel keeps track of all of the DMA requests required by each processing task of that remote processor. The kernel must also inform tasks executing on the remote processor when the DMA request is complete, so that the task can continue to execute. It is desirable to accomplish direct memory access without involving the kernel of a remote processor, so that the kernel can be free to accomplish other tasks.

SUMMARY OF THE INVENTION

It is an object of the present invention to provide a unit that is associated with a remote processor in a multi-processing system, which unit provides direct memory access for the remote processor relative to a host processor in the system.

The present invention provides a multi-processing system that includes a first processor having a first memory, a second processor having a second memory, said second processor having an operating system, a bus that provides communication between said first processor and its first memory and said second processor and its second memory, and means for performing direct memory access operations between said first and second memories along said bus on behalf of said second processor, said means for performing direct memory access operations between said first and second memories operating independently of said second processor operating system.

The present invention provides a Direct Access Memory Unit (DAU that is associated with a remote processor in a multi-processing system. The DAU performs Direct Memory Access (DMA) operations independently of a Central Processing Unit (CPU) in the remote processor. The CPU requests a DMA by writing information relevant to the DMA to the remote processor's memory. The information is written in the form of a control block and includes the address of the remote processor's memory, the address of the host processor's memory, a word count of the number of words in the DMA operation, and various command and status bits. The address of each control block is written to a circular queue, also in the remote processor's memory.

The DAU determines if there are any control blocks to process and thus if there are any DMA operations to perform. If there is a control block, the DAU will retrieve it, load it into registers, and perform the DMA operation (reading data from or writing data to the memory of the host processor), all without the intervention of the CPU of the remote processor. Thus, the CPU is free to perform non-DMA operations.

The circular queue allows the CPU to add control blocks for processing at the same time that the DAU is performing a DMA operation. The CPU adds a new control block by loading its address in a location in the circular queue that is ahead of the circular queue location that the DAU is processing. The CPU can abort a pending DMA request during DAU operations by setting a skip bit in the control block for the DMA request before the control block is processed by the DAU. The DAU will skip the specified control block and not process its DMA request.

Upon the completion of performing a DMA request, the DAU will set a complete bit in the control block in the remote processor's memory. An interrupt can also be sent to the CPU, wherein the CPU is advised that a DMA request has been completed. Thus, the DAU posts the completion of a DMA operation without the intervention of the CPU.

In another aspect of the present invention, the bus includes a first bus and a second bus having different data transmission rates. The present invention further includes means for providing transfers of bursts of data over said first and second busses, with the means for providing transfers of bursts of data being located between said first and second busses.

BRIEF DESCRIPTION OF THE DRAWINGS

FIG. 1 is a block diagram of a multi-processing system of the present invention in accordance with a preferred embodiment.

FIGS. 3A–3G are schematic diagrams of DAU registers, a queue list, a queue element and general purpose registers.

FIG. 4 shows a method for powering up the DAU, idling the DAU, and fetching a direct memory task for processing by the DAU. FIGS. 5–5C show a write operation. FIG. 6 shows a read operation. FIG. 7 shows a method for preparing for another direct memory task. FIG. 8 shows the processing of various errors.

DESCRIPTION OF THE INVENTION

Figure 1A:
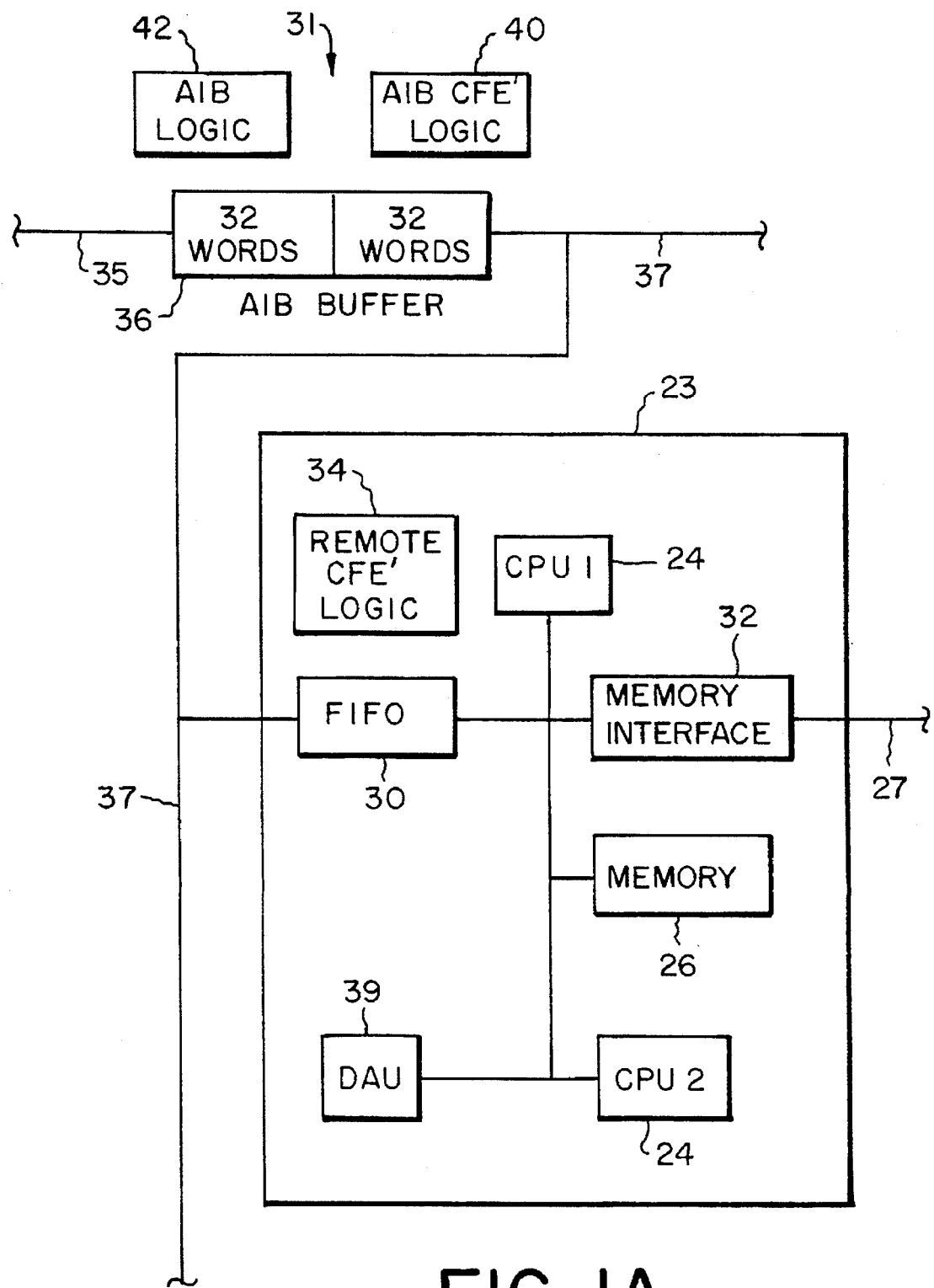
FIG. 1A is a block diagram of selected components of a remote processor and an Application Interface Board.

In FIG. 1, there is shown a block diagram of a multi-processing system 11 upon which the present invention can be practiced. The multi-processing system 11 includes many components which are grouped onto printed circuit boards or cards. There is a host processor card 13, which includes a host processor 15 (for example, an 80960 processor), an arbiter 17, and host memory 19 (typically DRAM). Local busses 20 provide communication between the host processor 15 and the arbiter 17 and between the arbiter and the host memory 19.

The system 11 also includes remote processor module cards 21, each of which contains a plurality of remote processors modules 23. Each remote processor module is associated with a memory 25 (typically DRAM). Each remote processor module 23 is connected to its DRAM by way of a Common Data Bus (CDB) 27. The system also includes an Application Interface Board (AIB Board) 31. The AIB Board 31 contains an Application Interface Board Chip (AIB) 33. The AIB 33 is connected to the arbiter 17 by way of a Common Front End (CFE) bus 35 and to the individual remote processors 23 by way of a Common Front End Prime (CFE') bus 37. Each bus in the system includes data, address and control lines.

In the preferred embodiment, each remote processor module 23 is a conventional Digital Signal Processor (DSP). The AIB 33 contains a DSP. The AIB 33 is used to interface the CFE bus 35 with the CFE' bus 37. These busses 35, 37 have different timings. The AIB 33 coverts the CFE bus 35 timings to the CFE Prime bus 37 timings, and vice versa.

The arbiter 17 on the host processor card 13 provides the host processor 15 with access to the host memory 19 and also to the CFE bus 35.

Referring to FIG. 1A, each remote processor module 23 includes a Central Processing Unit (CPU) 24, nonvolatile memory 26, a local bus 28, a First In First Out (FIFO) buffer 30, a memory interface 32 that connects to the CDB bus 27, and remote CFE' logic 34. In the preferred embodiment, each processor contains two CPU's 24. The memory interface 32 is used to read and write data to the DRAM. Each remote processor module 23 has an operating system or kernel that is executed by the CPU 24 and which performs those functions that are necessary for the remote processor module to execute its tasks. Each remote processor module also contains a Direct Memory Access Unit (DAU) 39. In the preferred embodiment, the DAU 39 consists of hardware logic circuits located in the remote processor module. The remote processor module is a Digital Signal Processor (DSP) which has the CPU 24 and other logic circuits. It is these other logic circuits that make up the DAU. There may be more than one DSP associated with each DAU.

The AIB Board 31 has a circular FIFO buffer 36. CFE' control logic 40 and AIB logic 42 are also provided to control the flow of data through the buffers. The buffer 36 adapts the two busses 35, 37, which have different data rates. The CFE bus 35 transfers data at a faster rate than does the CFE' bus 37.

Figure 2:
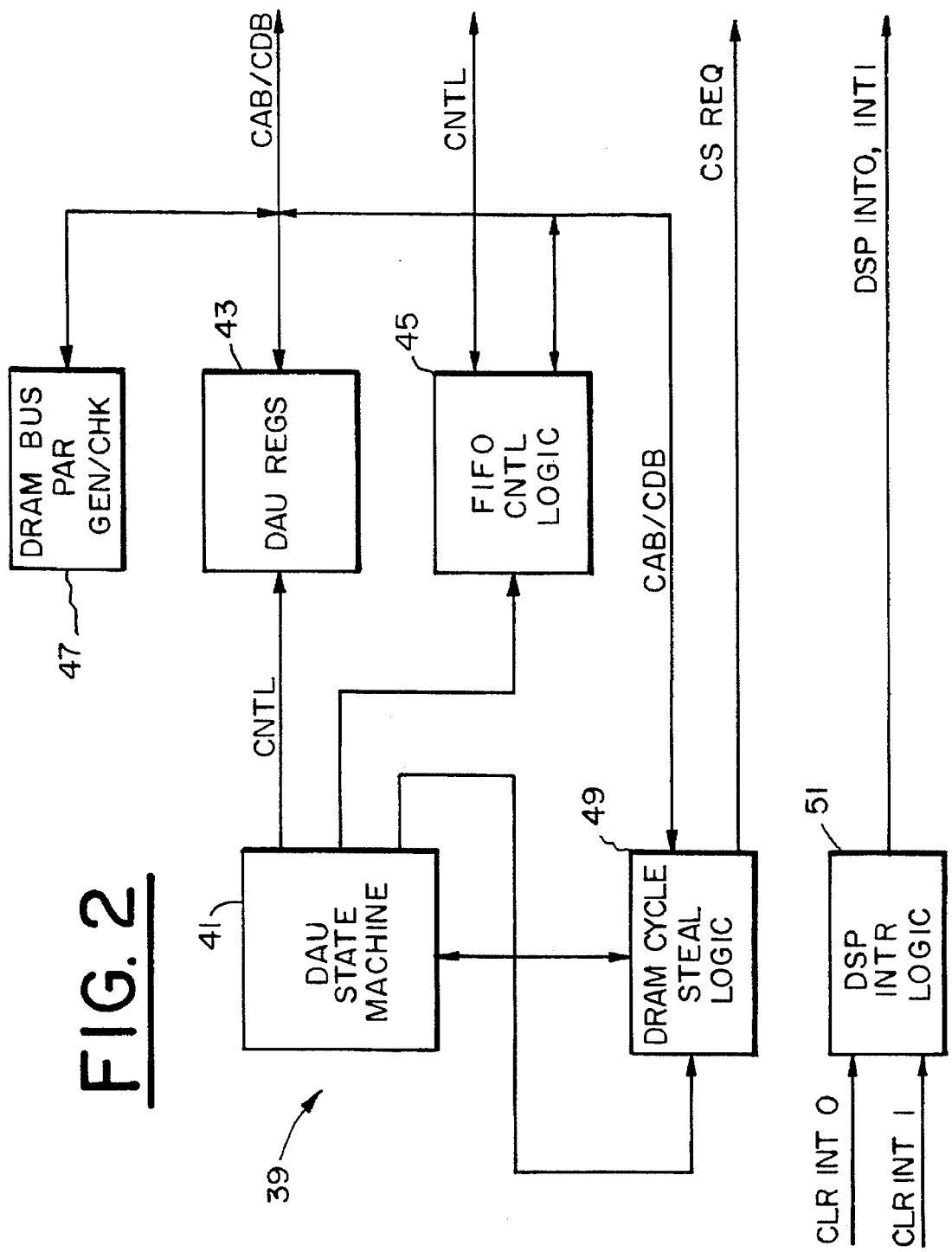
FIG. 2 is a block diagram of the Direct Memory Access Unit (DAU) of the present invention, in accordance with a preferred embodiment.

Referring to FIG. 2, a block diagram of a DAU 39 is shown. The DAU 39 includes a state machine 41, which is the logic portion and will be described below with reference to the flow charts, DAU registers 43, FIFO buffer control logic 45, a DRAM bus parity generator and checker 47, DRAM cycle steal logic 49 and DSP interrupt reset logic 51. The DAU state machine 41 is the operating system or kernel of the DAU. The DAU registers 43, bus parity generator 47 and cycle steal 49 components are connected to the CDB 27 and the Common Address Bus (CAB) that connects the remote processor module 23 to its DRAM 25. The DAU registers 43 are described more fully below, with respect to FIGS. 3C–3E. The bus parity generator/checker 47 is used to generate parity codes for data that is being sent to the host DRAM and also to check for parity in data that is received from the host DRAM. The FIFO control logic 45 is used to control a FIFO queue that is part of the remote processor module. The FIFO is used to transfer data and addresses to and from the CFE' bus 37. The DRAM cycle steal logic 49 is used to transfer data and addresses between the DRAM 25 and the FIFO, without the intervention of the CPU.

Figure 3C:
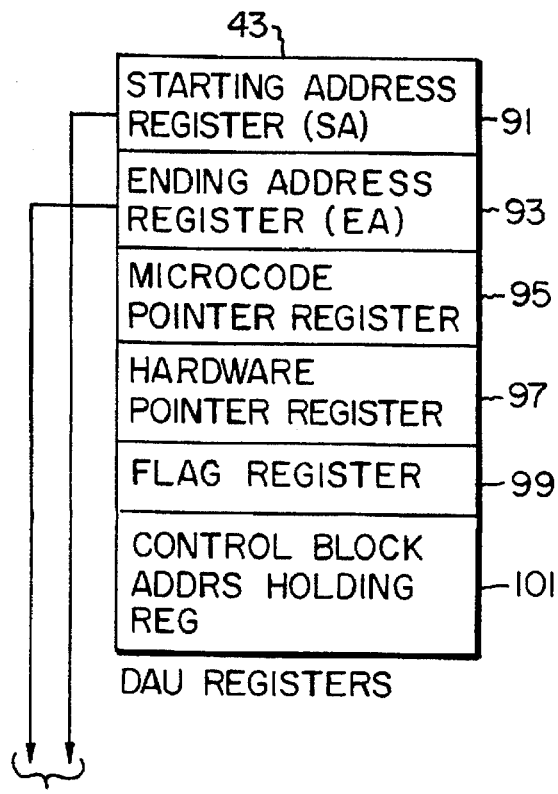

An overview of the various registers and queues will now be described. Referring to FIG. 3A, there is control block 71 for each DMA transfer. The control blocks are located in the remote processor module DRAM 25. Each control block contains all of the information which is necessary to execute a DMA transfer to or from the DRAM 25. A circular queue 73 (FIG. 3E) is provided as a buffer that resides in low memory (the first 64K) of the remote processor module DRAM 25. Each element 89 of the circular queue 73 contains the address pointing to the location of a corresponding control block 71. The DAU registers 43 (FIGS. 3C, 3D, and 3E) are used to address the location of where the circular queue is located in the DRAM 25, along with control bits and status bits. In addition, the DAU registers are used to indicate if a DMA transfer is to be executed. The DAU registers 43 are part of the DAU and are shown in FIG. 2.

The control block 71 will now be described with reference to FIG. 3A. There is a control block provided for each DMA transfer. The control block 71 has words zero–three. Word zero 81 has a first part (bits 15–11) and a second part (bits 10–0). The first part of word zero 81 contains address, command, and status bits. Bit 15 (the most significant bit) contains the seventeenth bit of the address for the data in the DRAM 25. The first sixteen address bits are provided by word one 83 of the control block 71. Bit 14 (a command bit) is a skip bit. When set to on, the skip bit indicates to the DAU state machine 41 (FIG. 2) that the control block, although it may be valid, is not to be processed. Thus, the next element in the circular queue 73 is processed. The DAU state machine will write back into word zero of the control block with both skip bit and a complete bit (bit 12) on. Bit 13 (a command bit) is an interrupt bit that enables and disables interrupting of the remote processor module 23 upon a successful completion of the processing of the control block 71. The DAU uses two interrupts, namely INT 0 (error) and INT 1 (completion). The interrupt bit only affects INT 1. Bit 12 (a status bit) is a complete bit that indicates that the control block has been processed without an error. The complete bit is set after the DAU state machine 41 is signaled that a successful transfer has been completed for the current control block. Bit 11 (a command bit) is a write/-read bit. (In discussing bits herein, the format X/-Y indicates that Y is active low.) This bit indicates if the data transfer is a write to or a read from the host memory. All data transfer direction references herein are with respect host memory 19.

The second part of word zero 81 (bits 10–0) contains the word count of the data transfer. The word count is 11 bits for a possible DMA data length of 2047 words. A word count of zero is an illegal value which will generate an INT 0 to the remote processor module 23 and cause the DAU 39 to enter a halt mode. The word count is not checked for a valid value if the skip bit is on.

Word one 83 of the control block 71 contains 16 bits of address for the location of where the DMA data will come from or go to in the remote processor module DRAM 25. The 16 bits of word one 83 and bit 17 in word zero 81 of the control block make up bits 17-1 of the DRAM address. Bit 0 is always understood to be zero because only word boundaries are addressed. The hardware of the DAU drives bit 0 to a low. All 128K addresses of the DRAM 25 can be addressed by the control block 71.

Word two 85 of the control block 71 contains the most significant 16 bits of a double word memory address of where the DMA data will come from or go to in the host memory 19 (see FIG. 1). Word three 87 of the control block 71 contains the least significant 16 bits of the double word memory address.

Figure 3B:
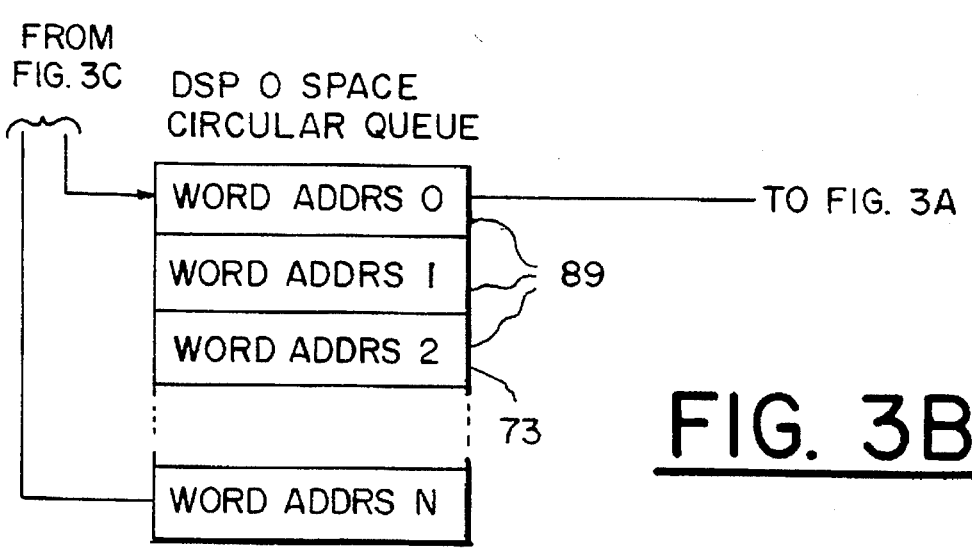

The circular queue 73 will now be described referring to FIG. 3B. The circular queue 73 is a buffer. Each element 89 contains the address pointing to where in the remote processor module DRAM 25 the respective control block is located. The elements 89 of the circular queue are in continuous locations and reside in low memory of the DRAM 25.

Figure 3E:
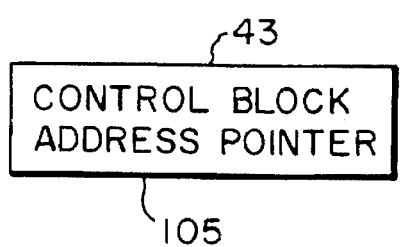
Figure 3F:
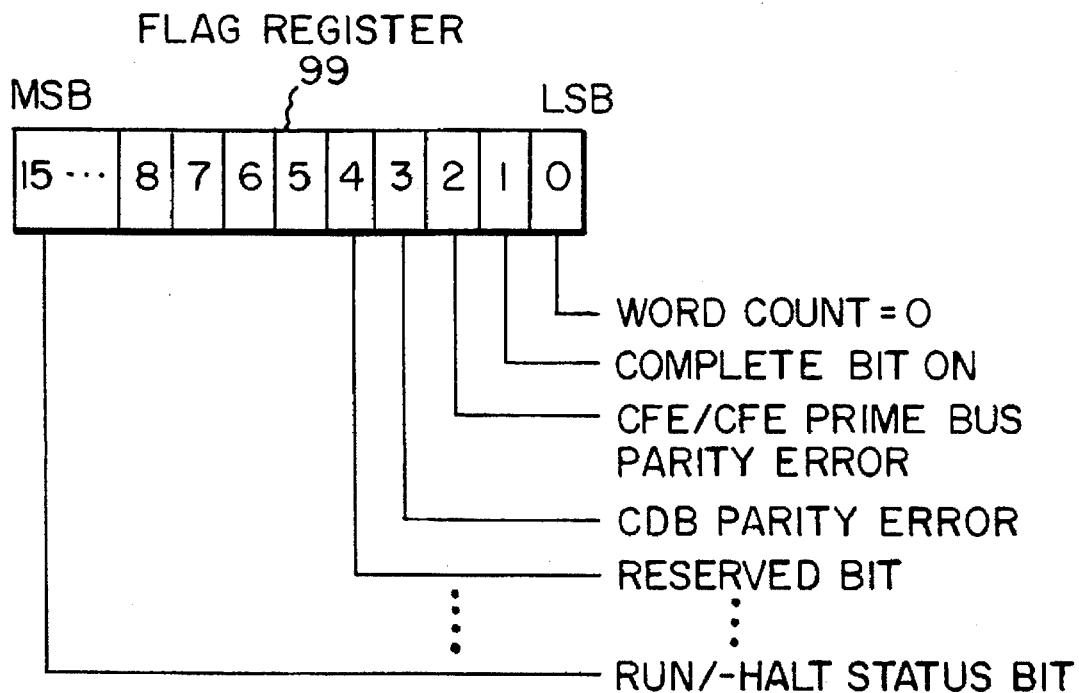
Figure 3D:
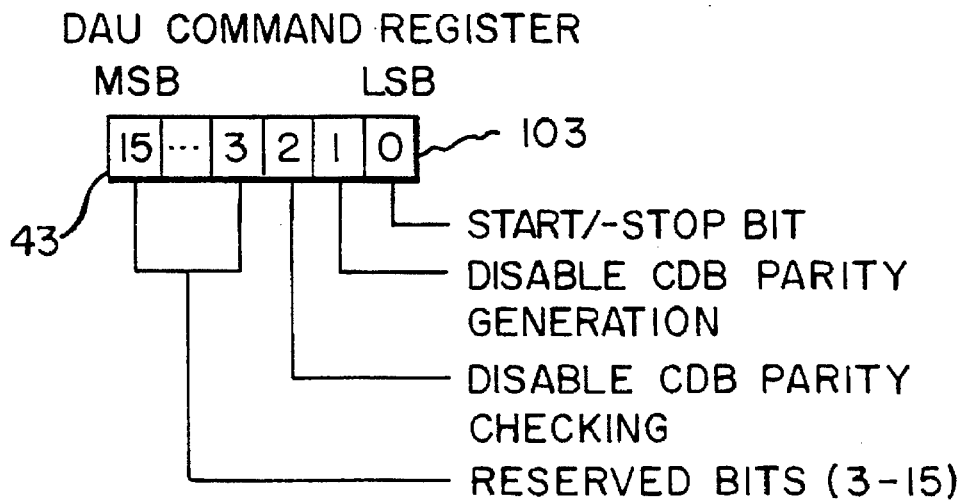

The DAU registers will now be described with reference to FIGS. 3C-3E. There are several DAU registers 43. Referring to FIG. 3C there is a circular queue starting address register 91, which is used to address the beginning (word address 0) of the circular queue 73. A circular queue ending address register 93 indicates the address of the last entry (word address N) in the circular queue 73.

There is a microcode pointer register 95 that contains a pointer of the new buffer that is set up by the remote processor module kernel. The microcode pointer register 95 is only updated by the remote processor module kernel when processing a DMA request. Under normal operation, the DAU state machine 41 (FIG. 2) can only read from, not write to, the microcode pointer register 95.

There is a hardware pointer register 97 that contains the pointer of the current buffer which the DAU state machine is currently processing. Normally, the remote processor module 23 can only read from this register 97. The register 97 is updated by the DAU state machine 41. However, if the DAU is in a halt mode, then the remote processor module 23 can write to this register.

A flag register 99 (FIGS. 3C and 3F) contains the control and status bits. Bit 0 of the flag register indicates if the word count is zero. Bit 1 indicates that the complete bit (of word zero 81 of the control block 71) is on. Bit 2 indicates a parity error on either the CFE or CFE' busses 35, 37. Bit 3 indicates a parity error on the CDB 27. Bit 15 is a run/-halt status bit. Bits 4-14 are reserved.

There is also a queue element address holding register 101 (FIG. 3C) that contains a copy of the address pointing to the particular control block 71 that is currently being processed by the DAU state machine. The address is fetched from the circular queue 73. At the end of processing of the control block, the address holding register 101 is used to write back word zero 81 of the control block with an updated status (that is with an updated complete bit).

There is also a command register 103 (see FIG. 3D) that contains the command bits for the DAU state machine. Bit 0 is a start/-stop bit. Bit 1 disables DAU parity generation. Bit 2 disables DAU parity checking. Bits 3-15 are reserved.

There is also a control block address pointer 105 (see FIG. 3E) that is a counter that points to the location of the control block 71 which is being processed by the DAU 39. When the address from the circular queue 73 is fetched and put into the queue element address holding register 101, that address is also copied in the control block address pointer 105. The control block address pointer 105 is used by the DAU to generate the address for fetching the words of the control block from DRAM.

There are also general purpose registers 72 that are located in the remote processor module 23. These registers are used to hold the words of the control block as the words are fetched from the DRAM 25.

Figure 4:
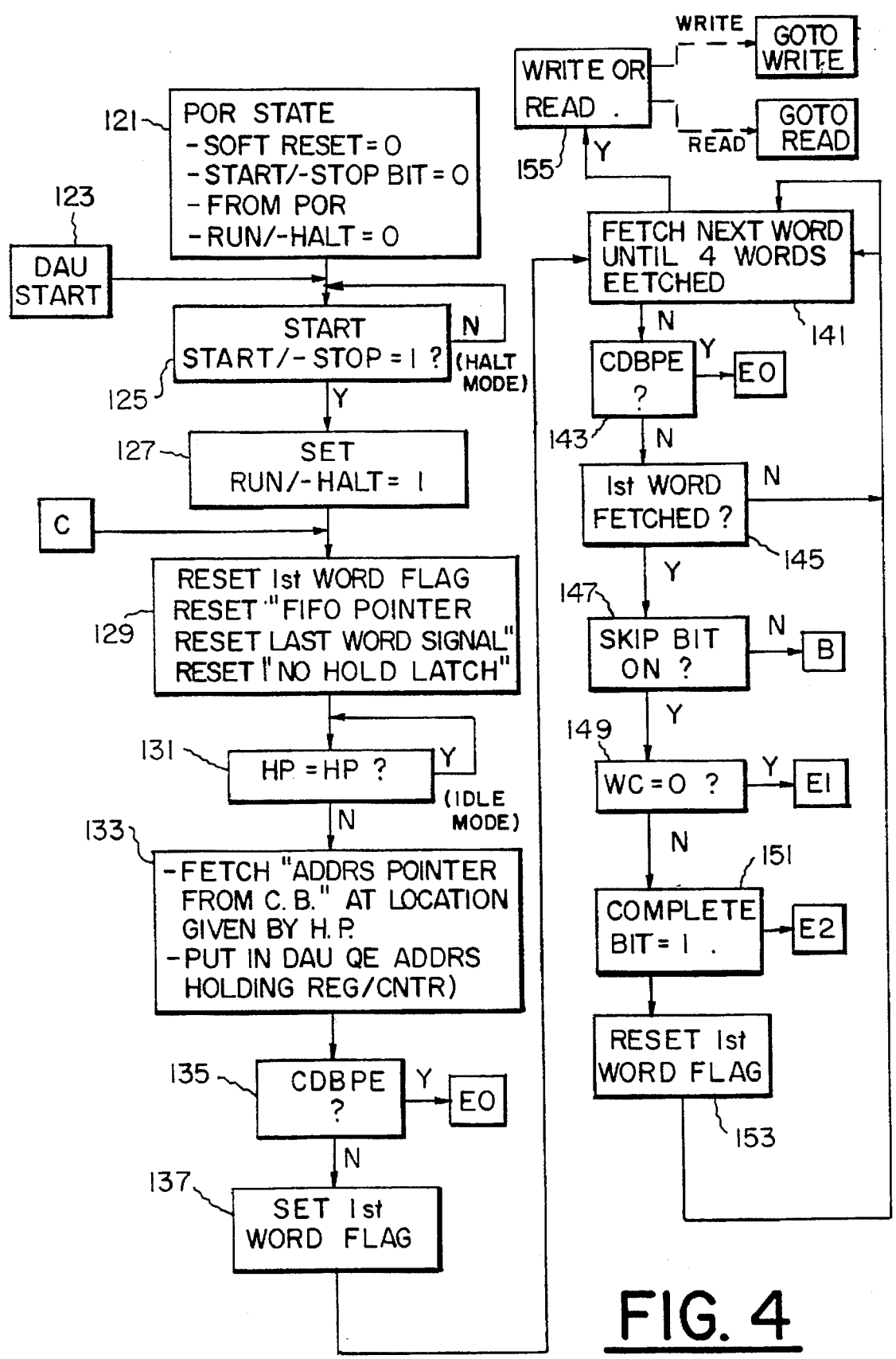
FIGS. 4–8 are flow charts of the present invention.

The operation of the DAU state machine 41 will now be described, with reference to the flow charts. In FIG. 4, there is shown a power up and idle flow chart. In step 121, the DAU 39 as well as its associated remote processor module 23 is powered on and reset (or initialized). The start/-stop bit in the command register 133 (see FIG. 3D) is set to 0. The run/-halt bit in the flag register 99 (see FIG. 3F) is also set to 0. These steps can be executed by the remote processor module kernel. Then, in step 123, the DAU 39 starts operation. The DAU state machine 41 configures the registers shown in FIGS. 3C-3F.

In step 125, the DAU 39 determines if the start/-stop bit is 1. If the result of step 125 is NO, then the DAU is in the halt mode and repeats steps 125 until the bit is set to 1. The DAU state machine is in the halt mode until the DAU is activated by the remote processor module 23. A DMA transfer is requested by the remote processor module kernel, which sets the start/-stop bit to 1 in the command register 103. If the result of step 125 is YES, then the run/-halt bit is set to 1. In step 129, various flags and pointers are reset. These are a First Word Flag, a FIFO (First-In First-Out) pointer, a Last Word Signal, and a No Hold Latch.

The DAU 39 is activated by the remote processor CPU kernel so that DMA transfers may be initiated by tasks running on the remote processor CPU. For each DMA transfer, the remote processor module 23 makes up a control block 71. The control block 71 contains information regarding the DMA operation, such as the memory addresses of where the data is to be fetched form and sent to. The address of the control block is added as an element 89 in the circular queue 73. The remote processor module starts at the top (word address 0) of the circular queue 73 and adds entries thereto. When the remote processor module reaches the end (word address N) of the circular queue 73, it wraps around to the top of the circular queue, thus implementing circular addressing. The control block 71 and the elements 89 in the circular queue are written to the DRAM 25 by the CPU 24 via the memory interface 32 (FIG. 1A). In addition to adding an element to the circular queue, for each DMA transfer, the remote processor module 23 updates the microcode pointer register 95 (FIG. 3C). The remote processor module should set the microcode pointer ahead of the hardware pointer (which points to the circular queue 73 element 89 that the DAU is currently processing) so that the DAU does not attempt to process a circular queue entry that has no corresponding control block. The remote processor module sets the word count to the size of the data.

By using control blocks 71 and the circular queue 73, the CPU 24 can change the quantity of DMA operations during the processing of the control blocks by the DAU. Thus, as the DAU 39 is processing control blocks to implement DMA requests, the CPU can add control blocks to be processed by simply writing other control blocks to the DRAM and their addresses to the circular queue 73. The new addresses are added to locations in the circular queue that are ahead of the addresses that are being processed by the DAU. If the DAU catches up by processing all of the control blocks pointed to by the circular queue, then the DAU is in idle mode until other control blocks and their addresses are written. The CPU can also cause the DAU to skip a control block after the control block has been written to the DRAM. This is accomplished by the CPU setting the skip bit for the respective control block.

In addition, DMA requests are fully programmable by the CPU as to the DMA direction, its size, and the source and destination addresses.

In step 131, it is determined if the microcode pointer (from the microcode pointer register 95) equals a hardware pointer (from the hardware pointer register 97). If they are equal, then there are no current control blocks to process. Thus, the DAU enters the idle mode, wherein step 131 is repeated. The DAU idles because it has caught up with the remote processor module 23 in that the DAU 39 has processed all of the current DMA requests by the remote processor module.

Figure 8:
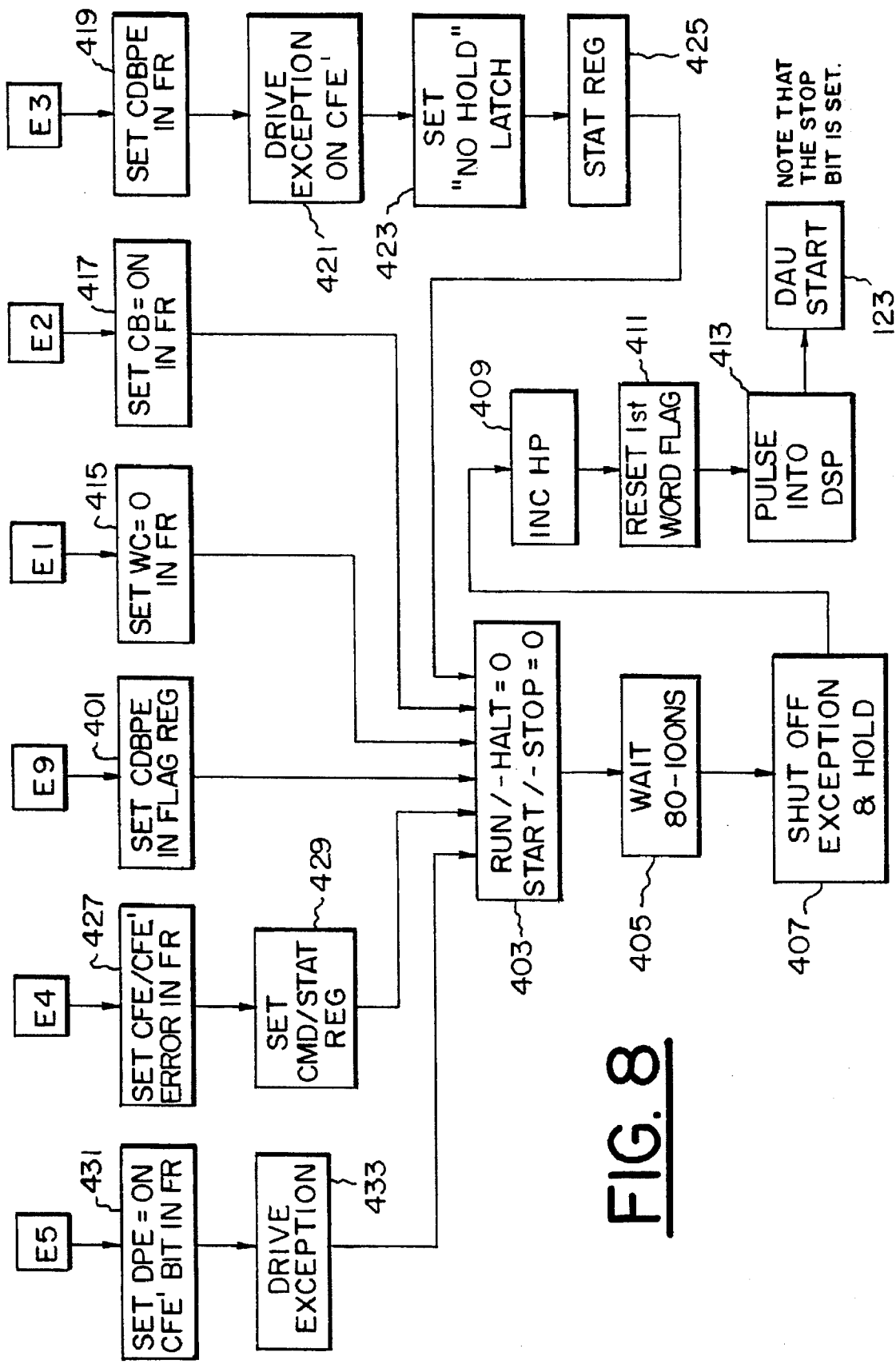

If the microcode pointer is not equal to the hardware pointer, then there are control blocks (and DMA requests) to process. In step 133, the DAU state machine 41 uses the hardware pointer to determine which circular queue element 89 to fetch, and fetches that element. The address in the queue element 89 is obtained from DRAM 25 over the CDB 27. The address is stored in the queue element address holding register 101 and also in the control block address pointer 105. In step 135, a parity error check is made. If YES, a parity error has occurred, then step 401 in FIG. 8 is executed. If the result of step 135 is NO, then in step 137, the first word flag is set.

Figure 7:
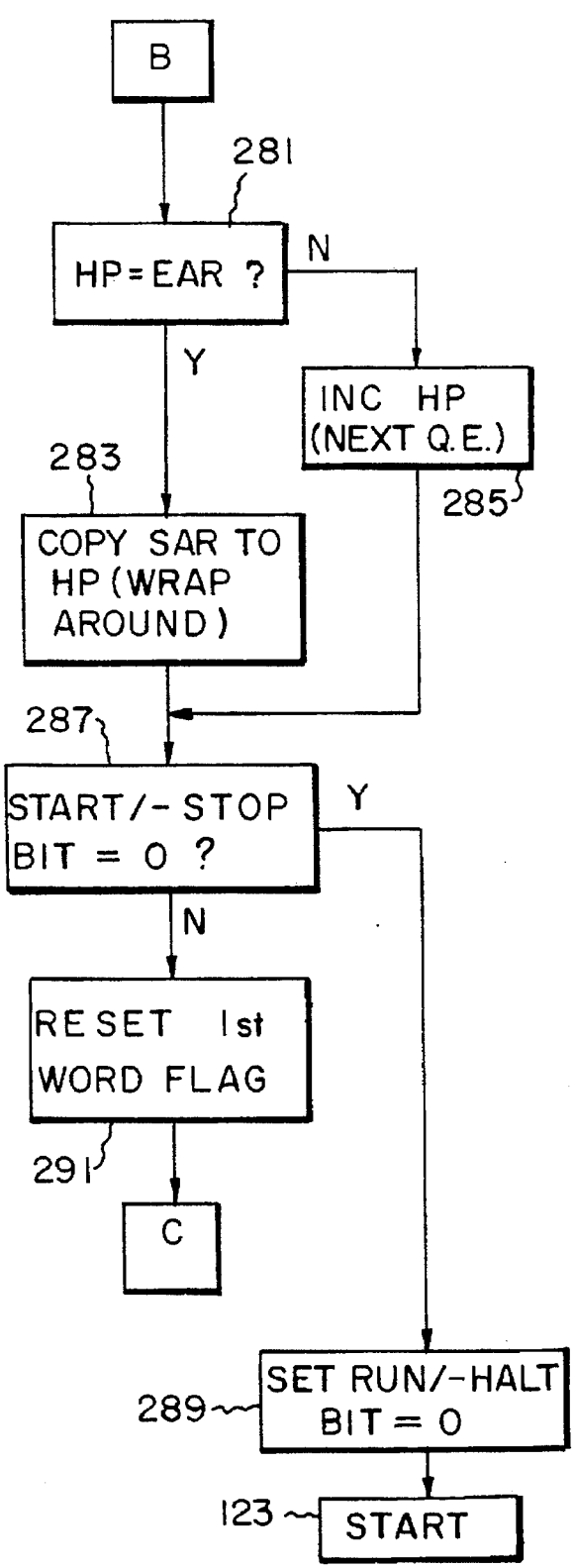

Next, the four words of the control block are fetched from the DRAM 25 over the CDB 27. The control block words are fetched one at a time, step 141, and put into the general purpose registers 72 (FIG. 3G) of the remote processor module 23. The DRAM cycle steal logic 49 (FIG. 2) is utilized to fetch the control block words without interrupting the CPU and without the need for any intervention on the part of the CPU. After each word is fetched, a parity error check is made, step 143. If a parity error is found, then step 401 of FIG. 8 is executed. If no parity is found, then it is determined if the word that has been fetched is the first word (word zero 81) of the control block 71, step 145. This is determined from the First Word Flag. If the First Word Flag is set, then the fetched word is the first word and step 147 is executed. In step 147, it is determined if the skip bit (bit 14) is on. If YES, then step 281 of FIG. 7 is executed. If the result of step 147 is NO, then 149 determines if the word count of the control block is 0. If YES, then step 415 of FIG. 8 is executed. If the result of step 149 is NO, then step 151 determines if the complete bit (bit 12) is 1. If YES, then step 417 of FIG. 8 is executed. If the result of step 151 is NO, then in step 153 the First Word Flag is reset.

Figure 5:
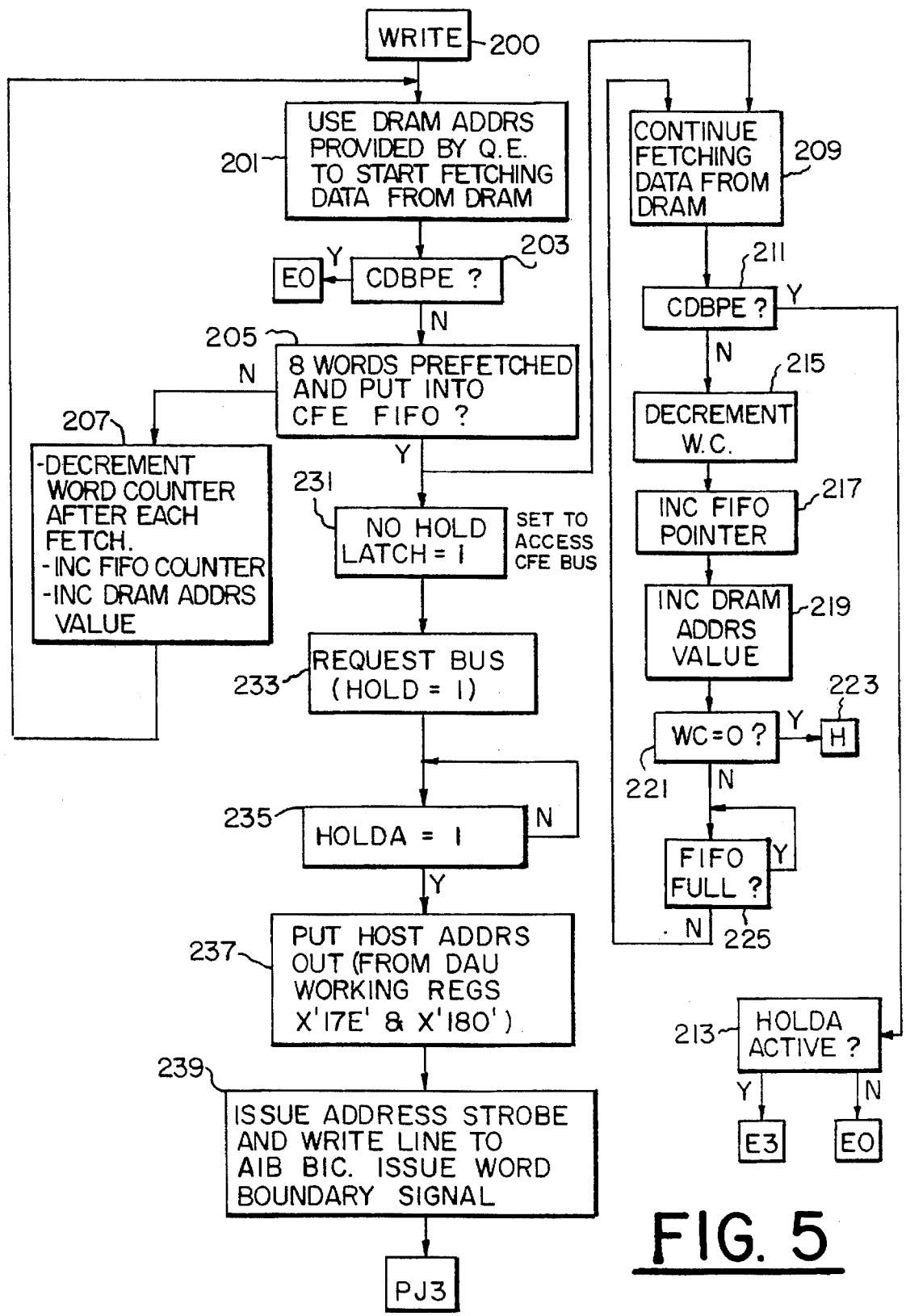
Figure 6:
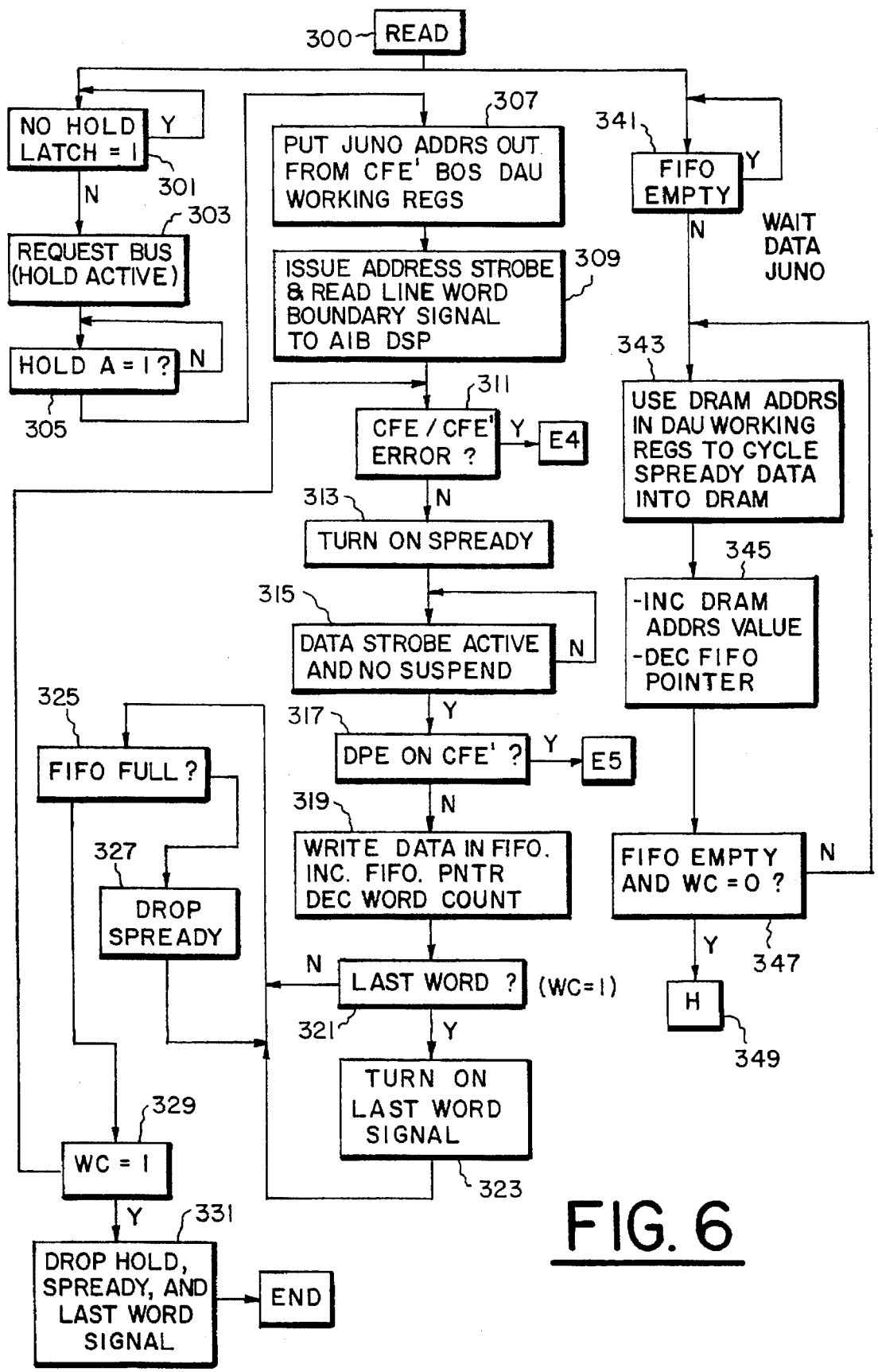

After step 153, or if the result of step 145 is NO, then step 141 is executed again to fetch the next word of the control block 71. Because the First Word Flag has been reset, steps 147–153 are not executed for words one–three. After word three (The last word) of the control block has been fetched, step 141, and checked for parity error, step 143, the determination of whether the DMA transfer is a read or a write from the host memory is made, step 155. This is determined from the write/-read bit (bit 11 of word zero) of the control block. If the DMA transfer is a write, then the flow chart of FIG. 5 is executed. If the DMA transfer is a read, then the flow chart of FIG. 6 is executed.

Referring to FIGS. 1A and 5, a write operation will be described. In step 200, the DAU loads the addresses and the write/-read bit into the remote CFE' logic 34. In step 201, the method begins to fetch the data from the DRAM 25 by using the DRAM address provided by word one 83 of the control block. The data is put into the FIFO 30 in the remote processor module 23. In step 203, a parity check is performed on the data that is transferred over the CDB bus 27. If the result of step 203 is YES, then a parity error has occurred and the method proceeds to step 401 of FIG. 8. If the result of step 203 is NO, then it is determined if eight words have been fetched. In the preferred embodiment, the data is sent over the CFE bus 35 in bursts of 32 words or less each. This determination is made from the word count in word zero 81. If the result of step 205 is NO, then step 207 is performed. In step 207, the word count is decremented, the FIFO counter is incremented, and the DRAM address value is incremented. Then, step 201 is repeated, wherein the next word is fetched.

If the result of step 205 is YES, all eight words have been fetched, then two methods begin to execute simultaneously in order to transfer the data over the CFE bus 35. The first method executes in the DAU 39 (by the DAU state machine or kernel). The second method executes in the AIB CFE' logic blocks 40, 42.

Regarding the first method, step 209 continues to fetch data from the DRAM. The data is put into the FIFO 30. In step 211, a parity check on the data is performed. If the result of step 211 is YES, there is a parity error, then in step 213 it is determined if HOLDA is active. HOLDA is inactive while waiting for the host arbiter 17 to acknowledge calls for a data transfer, after which acknowledgement HOLDA is set to active or 1. If HOLDA is active, then step 419 of FIG. 8 is performed. If HOLDA is not active, then step 401 of FIG. 8 is performed.

If the result of step 211 is NO, there is no parity error, then the word count is decremented, step 215. In step 217, the FIFO pointer is incremented. In step 219, the DRAM address value is incremented.

In step 221, the method determines if the word count is 0. If the result of step 221 is YES, then the first method ends, step 223, because all of the data has been fetched from the DRAM 25. If the result of step 221 is NO, then in step 223, it is determined if the CFE FIFO is full. If the result of step 223 is YES, the FIFO is full, then step 225 is repeated until a NO results. A NO result causes step 209 to be repeated, wherein additional data is fetched from the DRAM and put into the FIFO queue.

Regarding the second method, which is performed by the AIB CFE' logic blocks 40, 42, in step 231, No Hold Latch is set to 1. In step 233, the remote processor module 23 requests ownership of the busses 35, 37 by setting Request BUS to 1. In step 235, the second method determines if HOLDA is 1. HOLDA is inactive while waiting for the host arbiter 17 to acknowledge calls for a data transfer, after which acknowledgment HOLDA is set to active or 1. If the result of step 235 is NO, then step 235 is repeated to wait for an acknowledgment from the arbiter 17. If the result of step 235 is YES, then in step 237 the host processor address is put out from the general purpose registers 72. In addition, the remote CFE' logic 34 transfers the DMA start address and write/-read bit to the CFE' logic 40 in the AIB Board 31, which in turn sends it to the AIB logic 42. In step 239, an address strobe is issued and a read/write line is issued to the Bus Interface Controller (BIC) on the AIB Board 31. Also, a word boundary signal is issued.

Figure 5A:
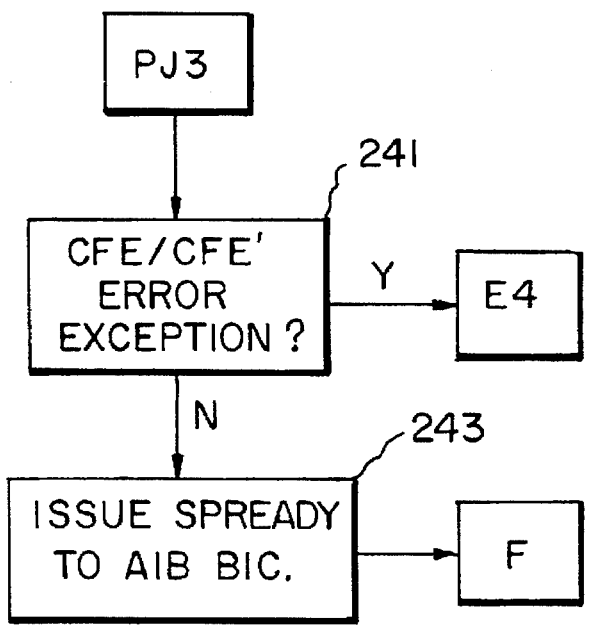

After step 239, the method proceeds to step 241 of FIG. 5A. In step 241, the method determines if there is an error exception on either of the CFE or CFE' busses. If the result of step 241 is YES, then the method proceeds to step 427 of FIG. 8. If the result of step 241 is NO, then the method proceeds to step 243. In step 243, SPREADY is issued to the BIC on the AIB Board 31 to indicate that data is ready to be transferred.

Figure 5C:
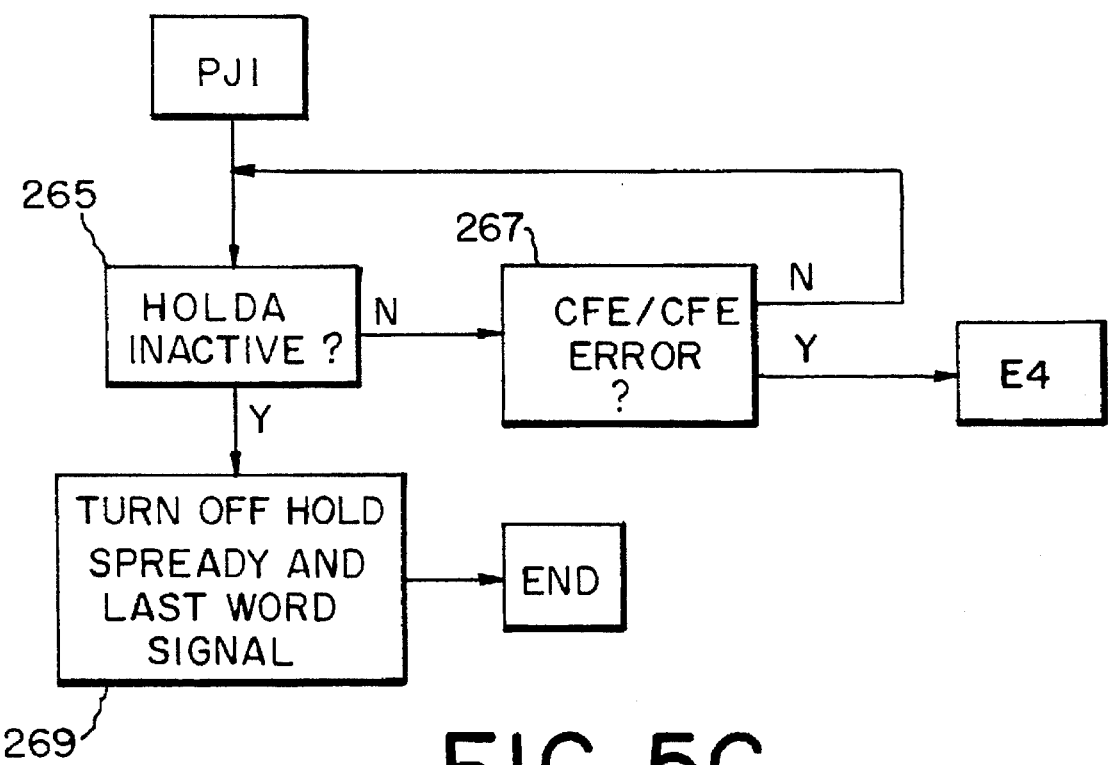
Figure 5B:
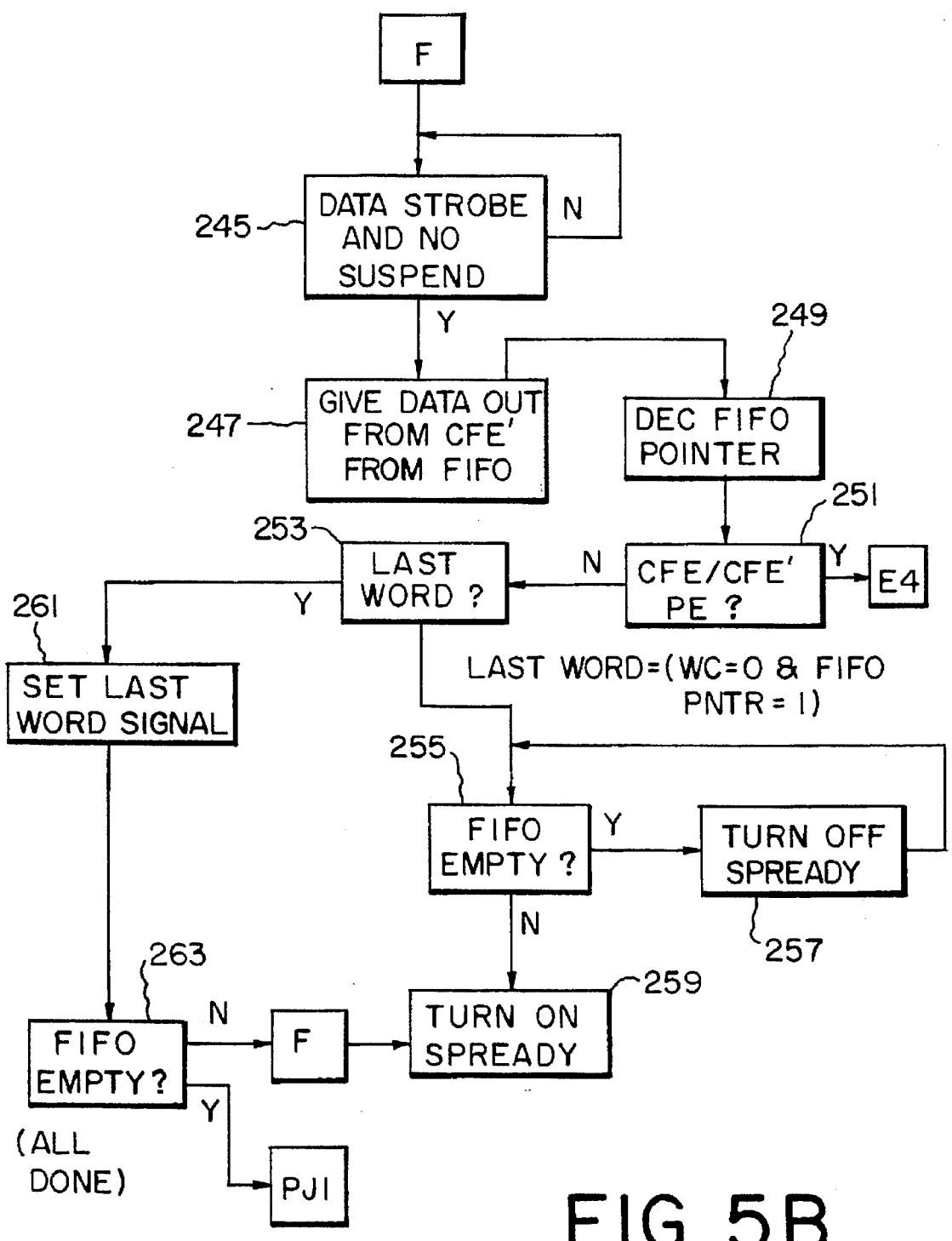

After step 243, the method proceeds to step 245 of FIG. 5B. In step 245, the method determines if the data strobe is active and if them is been no suspension of data transmission over the busses. If them is a suspension (a NO result from step 245), then step 245 is repeated.

If the result of step 245 is YES, then in step 247, the remote CFE' logic 34 (FIG. 1A) puts the data onto the CFE' bus 37 from the FIFO 30. The data is transferred to the AIB buffer 36. The AIB logic 42 transfers the data to the host DRAM 19 in bursts of 32 words.

In step 249, the FIFO pointer is decremented. In step 251, the method determines if any parity error has occurred on the CFE or CFE' busses. If the result of step 251 is YES, then the method proceeds to step 427 of FIG. 8. If the result of step 251 is NO, then in step 253, the method determines if the last word has been sent over the busses. After the last word is sent, the word count is zero and the FIFO pointer is 1. If the result of step 253 is NO, then the last word has not yet been sent and the method proceeds to step 255. In step 255, the method determines if the FIFO 30 is empty. If the result of step 255 is YES, then in step 257, SPREADY is turned off to indicate that the FIFO is not ready. After step 257, step 255 is repeated. If the result of step 255 is NO, the FIFO is not empty, then SPREADY is turned on, step 259. After step 259, the method returns to step 245.

If the last word has been sent over the busses, a YES result from step 253, then the method proceeds to step 261. In step 261, the Last Word Signal is set. Then, in step 263, the method determines if the FIFO 30 is empty. If the result of step 263 is NO, then the data transfer is not yet done and the method returns to step 245. If the result of step 263 is YES, then the data transfer is all done and the method proceeds to step 265 of FIG. 5C. In step 265, the method determines in HOLDA is inactive. If the result of step 265 is NO, then in step 267, a bus parity check is made. If the result of step 267 is YES, there is a parity error, then the method proceeds to step 427 of FIG. 8. If there is NO parity error, then step 265 is repeated until HOLDA becomes inactive. After HOLDA becomes inactive, indicating that the arbiter 17 has taken away control of the CFE bus, a YES result from step 265, then HOLDA, SPREADY, and Last Word Signal are turned off, wherein the remote processor module releases the busses 35, 37, step 269, because the write operation is complete for that particular control block.

Figure 5D:
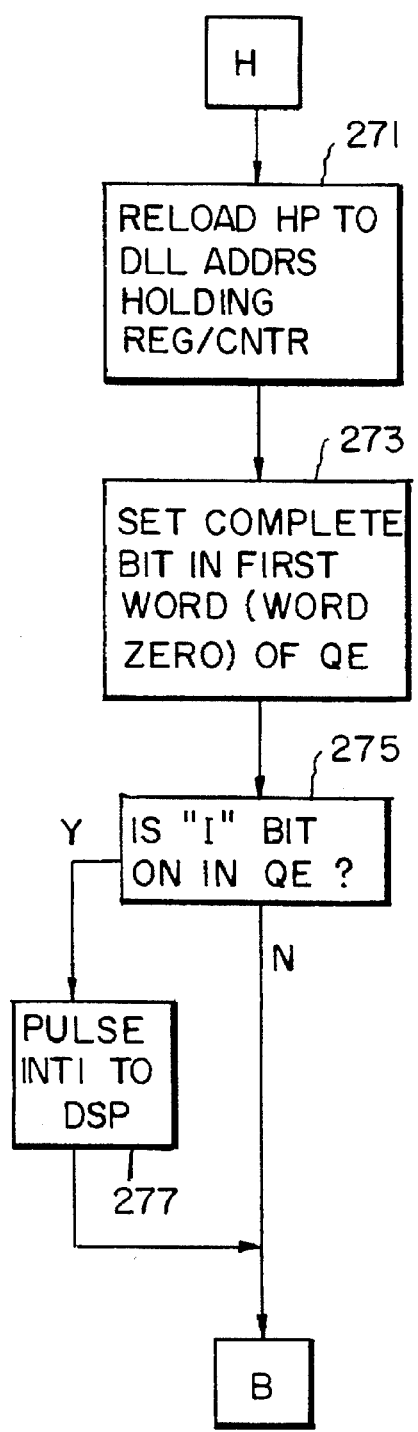
FIG. 5D shows setting a complete bit after either a write or a read operation.

Then, the method proceeds to step 271, FIG. 5D. In step 271, the hardware pointer is reloaded from the hardware pointer register 97 to the address holding register 101. Then, in step 273, the complete bit in word one of the control block that has just been processed is set to 1. In step 275, the method determines if the interrupt bit is on in the control block that has just been processed. If the result of step 275 is YES, then in step 277, INT 1 is pulsed from the DSP interrupt logic 51 to the remote processor module 23. This advises the remote processor module that the control block has been processed and the DMA is finished. Thus, the DAU 39 is able to post the completion of a DMA operation without the intervention of the CPU. After step 277, or if the result of step 275 is NO, the method proceeds to step 281 of FIG. 7.

The interrupt advises the CPU that a DMA operation or request has been completed. The CPU can then poll the control blocks, to determine which one has a set complete bit. The CPU then continues with its operation.

The method of FIG. 7 is used at the end of a DMA operation to advance queue pointers and to make ready for another DMA operation. The method of FIG. 7 is also used if the skip bit has been set. Thus, the CPU can load a DMA operation into the DRAM and then later abort the operation by setting the skip bit. The skip bit is set by a write operation to the DRAM.

In step 281 of FIG. 7, the method determines if the hardware pointer equals the ending address in the register 93. If the result of step 281 is YES, then the end of the circular queue 73 has been reached and the method wraps around to the top of the circular queue. This is done in step 283 wherein the starting address is copied into the hardware pointer register 97. If the end of the circular queue has not been reached, then a NO is produced by step 281 and the hardware pointer is incremented, step 285. After either of steps 283 or 285, the method proceeds to step 287 to determine if the start/-stop bit is 0. If the result of step 287 is YES, then in step 289, the run/-halt bit is set to 0. After step 287, the method returns to step 123 of FIG. 4, wherein the DAU enters the halt mode. If the result of step 287 is NO, then in step 291, the First Word Flag is reset and the method returns to step 129 of FIG. 4 to process another control block, when one is available.

Referring to FIGS. 1A and 6, a read operation will now be described. In step 300, the DAU 39 loads the addresses and the write/-read bit into the remote CFE' logic 34. After step 300, the read operation has two methods, namely a first method which is executed by the AIB CFE' logic blocks 40, 42 and a second method which is executed by the DAU 39.

Regarding the AIB CFE logic blocks 40, 42 method, in step 301 the method determines if No Hold Latch is 1. If the result of step 301 is YES, then step 301 is repeated until a NO result is produced. After a NO result, a Request BUS is produced for the AIB logic 42, step 303, wherein the remote processor module 23 attempts to claim the busses 35, 37. In step 305, the method determines if HOLDA is active. If the result of step 305 is NO, then step 305 is repeated until a YES result (a bus acknowledgment) is produced, wherein the method proceeds to step 307. In step 307, the host memory address is put out onto the busses from the working registers 72. In step 309, the address strobe is issued, and the line word boundary signal is read to the AIB 33. In step 311, a parity error check is done on the host memory address. If an error is found, then the method proceeds to step 427 of FIG. 8. If there is no parity error, then step 313 turns on SPREADY. In step 315, the method determines if the data strobe is active and there is no suspension thereof. If the result of step 315 is NO (a suspension), then step 315 is repeated until data transmission begins or resumes on the busses. If data is being transmitted on the busses 35, 37, a YES result is produced by step 315. Then in step 317, a parity error check is made. If YES, there is a parity error, then step 431 of FIG. 8 is performed.

If there is NO parity error, then the data is written from the host into the remote processor's FIFO 30, step 319. The AIB logic 42 transfers the data from the host DRAM 19 onto the CFE bus 35 and into the AIB buffer 36. The AIB CFE' logic 40 transfers the data from the AIB buffer 36 to the remote buffer 30. The DAU 39 transfers the data from the buffer 30 to the DRAM 25.

The FIFO pointer is incremented and the word count is decremented. In step 321, the method determines if the last word has been transmitted. A YES result is produced if the word count is 1, wherein in step 323, the Last Word Signal is turned on.

After step 323, or if the result of step 321 is NO, the method proceeds to step 325. In step 325, the method determines if the FIFO queue in the remote processor module 23 is full. If the result of step 325 is YES, then SPREADY is dropped, step 327, and step 325 is repeated until the FIFO is no longer full. If the result of step 325 is NO, then in step 329, the method determines if the word count is 1 (indicating the last word). If the result of step 329 is NO, indicating that additional words are to be read, then the method returns to step 307. However, if the result of step 329 is YES, then HOLD, SPREADY, and LAST WORD SIGNAL are dropped, step 331. The DAU 39 sends a BLAST signal over the CFE' bus 37 to the CFE' control logic 40 to end the transfer. The AIB Board 31 ends the host data transfer and releases the busses 35, 37. The DAU also releases the busses. After step 321, the method proceeds to step 271 of FIG. 5D.

Regarding the DAU method of FIG. 6, in step 341, the method determines if the FIFO is empty. If the result of step 341 is YES, then step 341 is repeated until the FIFO acquires some data, after which the result of step 341 is NO. A NO result causes the method to proceed to step 343, wherein the data in the FIFO is cycled into the DRAM at the DRAM address in the DAU working registers. Then in step 345, the DRAM address value is incremented and the FIFO pointer is decremented. In step 347, the method determines if the FIFO is empty and the word count (WC) is zero. If the result of step 347 is NO, then the method returns to step 343 to write the next data to the DRAM 25. If the result of step 347 is YES, then the method ends, step 349.

Referring now to FIG. 8, the error processing method will be described. A CDB bus 27 parity error causes step 401 to execute, wherein bit 3 in the flag register 99 (see FIG. 3F) is set. Then, in step 403 the run/-halt bit and the start/-stop bit are both set to 0. In step 405, the method waits for 80–100 nanoseconds. In step 407, the method shuts off exception and hold. In step 409, the hardware pointer is incremented to allow processing of the next control block. In step 411, the first word flag is reset. In step 413, INT 1 is pulsed into the remote processor module 23 by the interrupt logic 51. Then, the method proceeds to step 123 of FIG. 4.

A word count of 0 during the first word fetch (a prematurely set word count) causes step 415 to be performed, wherein bit 1 of the flag register 99 (FIG. 3F) is set. A prematurely set complete bit causes step 417 to execute, wherein the complete bit (bit 1) of the flag register 99 is set. After either of steps 415 or 417, step 403 is performed.

A CDB parity error while HOLDA is active causes step 419 to be executed, wherein bit 3 of the flag register 99 is set. In step 421,the method drives exception on the CFE' bus 37. In step 423, No Hold Latch is set. In step 425, the method sets a command/status register, after which the method proceeds to step 403.

If a CFE or CFE' bus parity error occurs, step 427 sets bit 2 in the flag register 99. In step 429, the command/status register is set and then step 403 is performed.

If a data parity error occurs on the CFE' bus, then step 431 sets the data parity error to on and sets bit 2 in the flag register 99. In step 433, the method sets drive exception on the CFE' bus and then step 403 is performed.

The foregoing disclosure and the showings made in the drawings are merely illustrative of the principles of this invention and are not to be interpreted in a limiting sense.

We claim:

1. A multi-processing system comprising:
   a) host processor having a respective host data memory;
   b) a second processor having a respective second data memory; said second processor being required to have data communication with said host processor;
   c) a bus providing data communication between said host and second data memories, between said host processor and host data memory, and between said second processor and its second data memory;
   d) a direct memory access (DMA) controller communicating with said bus and said second data memory for directing transfers of varied-length blocks of data, via said bus, between said host and second data memories on behalf of said second processor, said DMA controller operating in response to control information written to said second data memory by said second processor; said control information defining locations in both said host and second data memories between which said block of data is to be transferred, and the direction in which said block of data is to be transferred; said second processor being capable of writing additional control information to said second data memory while said DMA controller is directing transfer of said block of data; said additional control information defining transfer of one or more additional blocks of data between said host and second data memories; said DMA controller being capable of directing said transfers of both said block of data and said one or more additional blocks of data without having to have any direct communication with either of said host and second processors;
   and further wherein said control information and said additional control information, respectively defining said transfers of said block of data and said one or more additional blocks of data, further comprise:
   a) plural control blocks stored in said second memory, said control blocks defining storage locations in both said host and second data memories representing sources and destinations of said data block and said one or more additional data blocks that are to be transferred; and
   b) a circular queue formed in said second data memory, said circular queue having pointer elements therein, one for each of said control blocks, with each of said pointer elements pointing to the location of the respective control block in said second memory; and wherein said second processor includes:
   c) means for writing information constituting said plural control blocks to said second data memory and for writing information constituting said pointer elements to said circular queue in said second data memory.

2. A multi-processing system according to claim 1, wherein said DMA controller further comprises:
   a) means for selecting individual said pointer elements in said circular queue; and
   b) means for retrieving respective said control blocks pointed to by said retrieved pointer elements.

3. A multi-processing system according to claim 1, wherein said DMA controller further comprises:
   a) a space reserved in each said control block for providing an indication of completion status for a data block transfer defined by the respective control block; and b) means for setting said completion indication in said respective control block when the said DMA controller has performed a data transfer defined by the respective control block to a point of completion of the respective transfer.

4. A multi-processing system according to claim 3 wherein said DMA controller further comprises means for interrupting said second processor when a said completion indication has been set in a said respective control block; said interruption requiring said second processor to examine all currently active control blocks for detection of said completion indication.

5. A multi-processing system according to claim 1, wherein said circular queue of pointer elements is variable in size according to the number of control blocks currently stored in said second data memory, and the amount of storage space in said second memory that is allocated to storing control blocks pointed to by said pointer elements is similarly variable in size.

6. A multi-processing system according to claim 1 wherein said bus comprises first and second buses connected in tandem and having different respective first and second transmission rates, and wherein said system further comprises means located between said first and second buses for transferring data between said first and second buses, in discrete bursts conforming to said different respective first and second transmission rates.

7. A method of performing direct memory access operations in a multi-processing system that comprises a first processor having a first memory, a second processor having a second memory, and a bus that provides communication between said first processor and its first memory, between said second processor and its second memory, between said first and second processors per se, and between said first and second memories, said method comprising the steps of:

a) writing a set of control information from said second processor to said second memory, said set of control information defining a single variable length data block transfer to be conducted between said second and first memories via said bus, said set of control information including information defining locations in both said second and first memories between which said single data block transfer is to be conducted; and b) performing a said direct memory access operation independently of both said second and first processors, to transfer a block of data between said locations in said second and first memories, in accordance with said set of control information written to said second memory by said second processor; said method further comprising steps of:

c) extending said step of writing said set of control information to include having plural sets of said control information written to said second memory from said second processor, said plural sets of control information respectively defining different data block transfers to be conducted sequentially between said second and first memories, and each set of control information in said plural sets containing information defining locations in both said second and first memories between which a respective block of data is to be transferred via a respective said direct memory access operation;

d) writing plural first pointers, into a circular queue in said second memory, defining locations in said second memory at which said plural sets of control information are stored; and e) providing a second pointer defining locations in said second memory containing said circular queue of first pointers; said second pointer providing a reference for locating all of said first pointers; and f) using said second and first pointers, extending said step of performing said direct memory access operation to include sequentially performing plural direct memory access operations, respectively defined by individual ones of said plural sets of control information stored in said second memory, and thereby transferring plural blocks of data between locations in said second and first memories defined by said plural sets of control information, without requiring further involvement of any of said second processors in any of said operations.

8. The method of claim 7 further comprising steps of sequentially retrieving successive ones of said first pointers from said circular queue, using said second pointer as a reference to locate an initial one of said first pointers, and using said retrieved first pointers successively retrieving sets of control information pointed to by respective first pointers, and using said retrieved sets of control information performing said plural direct memory access operations to successively transfer said plural blocks of data between said second and first memories.

9. The method of claim 8 further comprising steps of successively modifying said second pointer to point successively to individual ones of said first pointers and using said successively modified second pointers to retrieve respective successive ones of said first pointers as part of said steps of successively retrieving said sets of control information and performing said plural direct memory access operations.

10. The method of claim 9, further comprising the steps of providing second information associated with said second pointer for defining the size of said circular queue of first pointers, allowing spaces allocated in said second memory for storage of both said circular queue and said plural sets of control information to vary in size to accommodate an arbitrary number of said second sets of control information, determining if said second memory contains any of said sets of control information that have not been retrieved and processed, and if said second memory does not contain any said sets then waiting for said second processor to write another of said sets of control information to said second memory and first pointer information to said circular queue and then performing another block data transfer relative to said another of said sets of control information.

* * * * *